(12) United States Patent
Tamura et al.

(10) Patent No.: US 10,760,322 B2
(45) Date of Patent: Sep. 1, 2020

(54) VEHICLE DOOR OPENING/CLOSING DEVICE AND DETECTION UNIT

(71) Applicant: Honda Access Corp., Niiza-shi, Saitama (JP)

(72) Inventors: Yasuhiro Tamura, Niiza (JP); Ryoichi Enoki, Niiza (JP); Shoji Yokoyama, Niiza (JP); Jun Sugimoto, Niiza (JP); Tatsuya Tachibana, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 180 days.

(21) Appl. No.: 15/939,553

(22) Filed: Mar. 29, 2018

(65) Prior Publication Data

US 2018/0283080 A1 Oct. 4, 2018

(30) Foreign Application Priority Data

Mar. 31, 2017 (JP) ................. 2017-070123

(51) Int. Cl.
*E05F 15/76* (2015.01)
*B60R 25/20* (2013.01)
*B60R 25/31* (2013.01)
*B60R 25/24* (2013.01)

(52) U.S. Cl.
CPC ............ *E05F 15/76* (2015.01); *B60R 25/209* (2013.01); *B60R 25/2054* (2013.01); *B60R 25/24* (2013.01); *B60R 25/31* (2013.01); *E05Y 2400/30* (2013.01); *E05Y 2400/44* (2013.01); *E05Y 2400/66* (2013.01); *E05Y 2400/858* (2013.01); *E05Y 2900/531* (2013.01)

(58) Field of Classification Search
CPC ........ E05F 15/76; B60R 25/209; B60R 25/31; B60R 25/34; B60R 25/2054; B60R 25/24; E05Y 2400/858; E05Y 2400/44; E05Y 2400/30; E05Y 2400/66
See application file for complete search history.

(56) References Cited

U.S. PATENT DOCUMENTS

| | | | |
|---|---|---|---|
| 2007/0132552 A1* | 6/2007 | Kurpinski | G07C 9/00309 340/5.72 |
| 2016/0026191 A1* | 1/2016 | Fujimoto | B60J 5/00 701/49 |
| 2016/0251891 A1* | 9/2016 | Herthan | B60R 25/2054 49/31 |
| 2017/0106834 A1* | 4/2017 | Williams | H04W 4/80 |

(Continued)

FOREIGN PATENT DOCUMENTS

JP 2007-162459 A 6/2007

*Primary Examiner* — Justin B Rephann
(74) *Attorney, Agent, or Firm* — Westerman, Hattori, Daniels & Adrian, LLP

(57) ABSTRACT

In a state that an engine is started up by using a mobile device from outside a vehicle, a power mode changeover switch is switched from a fixed contact OFF to a fixed contact START while avoiding a fixed contact ACC and a fixed contact ON, and the power mode changeover switch is maintained at the fixed contact START even after the engine is placed in an operation state. When an electric power is not supplied through the fixed contact ACC, a detection unit places itself in a state in which a detection operation is possible, and when the electric power is supplied, the detection unit places itself in a detection operation prohibition state.

4 Claims, 9 Drawing Sheets

(56) References Cited

U.S. PATENT DOCUMENTS

| | | | |
|---|---|---|---|
| 2017/0106836 A1* | 4/2017 | Sobecki | G06F 3/0425 |
| 2017/0130509 A1* | 5/2017 | Sugiura | B60R 25/2054 |
| 2017/0232932 A1* | 8/2017 | Nishidai | B60R 25/23 |
| | | | 340/5.61 |
| 2017/0241187 A1* | 8/2017 | Takayanagi | E05F 15/75 |
| 2017/0357246 A1* | 12/2017 | Herthan | E05F 15/70 |
| 2019/0010749 A1* | 1/2019 | Sugiura | E05F 15/73 |

\* cited by examiner

FIG. 3
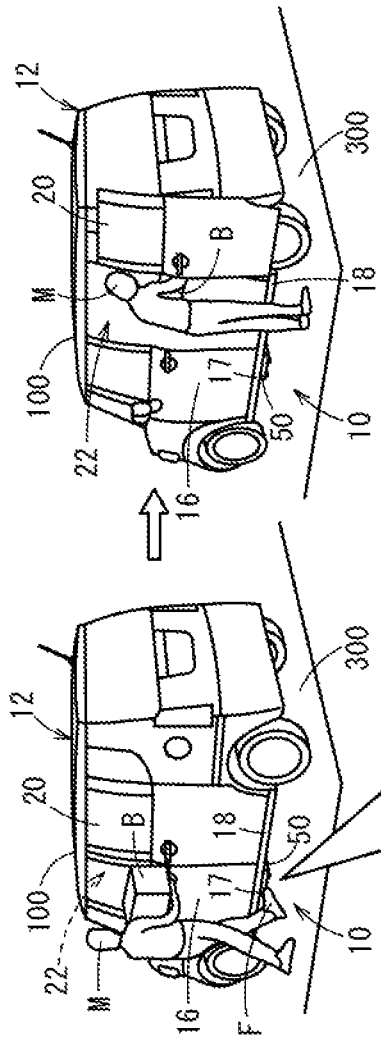
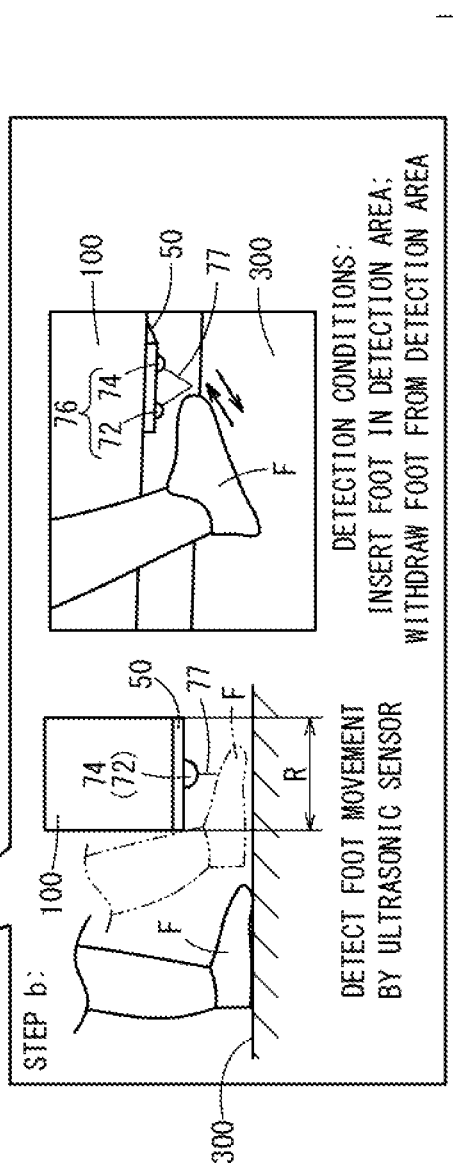

VEHICLE DOOR OPENING/CLOSING DEVICE AND DETECTION UNIT

CROSS-REFERENCE TO RELATED APPLICATION

This application is based upon and claims the benefit of priority from Japanese Patent Application No. 2017-070123 filed on Mar. 31, 2017, the contents of which are incorporated herein by reference.

BACKGROUND OF THE INVENTION

Field of the Invention

The present invention relates to a vehicle door opening/closing device including a mobile device that transmits a request signal for starting up a motive power source such as an engine of a vehicle from a location remote from the vehicle, and a detection unit provided on the vehicle and configured to detect the presence of a user standing near a door of the vehicle and thereby open the door.

Description of the Related Art

As one of the detection units that detect the presence of a user standing near a door of a vehicle, for example, Japanese Laid-Open Patent Publication No. 2007-162459 discloses that a laser beam transceiver provided directly below a rear seat door of the vehicle emits a laser beam toward the ground (paragraph [0025] in Japanese Laid-Open Patent Publication No. 2007-162459).

Japanese Laid-Open Patent Publication No. 2007-162459 discloses a hands-free door opening device. According to this device, when the user moves his/her foot so as to intercept the laser beam emitted toward the ground, the foot movement is used as a trigger to bring the door from a locked state to an unlocked state under the authentication with an electronic key, and then open the door slightly (referred to as partial opening) (see paragraphs [0025], [0055], and FIG. 9 in Japanese Laid-Open Patent Publication No. 2007-162459).

SUMMARY OF THE INVENTION

As described above, the laser beam transceiver is used as the detection unit that detects the presence of the user standing near the door.

Such a detection unit is designed such that, when an engine of a vehicle is driven, the detection unit recognizes that an occupant is in the vehicle and the vehicle is traveling, and then will not detect whether the user's foot is present near the door.

Incidentally, a mobile device that transmits a request signal for starting up the engine of a vehicle from a location remote from the vehicle is commercially available. By the use of such a mobile device, for example, the engine is driven to thereby energize in-vehicle electric components such as an air-conditioner before a user gets into the vehicle, conveniently.

However, in a case of starting up the engine of the vehicle from the distant place, there is a problem as follows: since the engine is driven, even though an occupant is not in the vehicle, the user who tries to open the door by using the detection unit (for example, including both a user who wants to get into the vehicle and a user who wants to open a door and load the vehicle with a package or the like) cannot open the door even if the user moves his/her foot under the laser beam in order to cause the detection unit to detect the presence of the foot. Thus, there is still room for improvement.

The present invention has been made in consideration of such a problem, and it is an object of the present invention to provide a vehicle door opening/closing device and a detection unit, that enable a user who wants to open a door by using the detection unit to open the door even in a case where a motive power source such as an engine of a vehicle is started up by using a mobile device that transmits a request signal for starting up the motive power source such as the engine from a location remote from the vehicle.

A vehicle door opening/closing device according to an aspect of the present invention includes: a mobile device configured to transmit a request signal for locking or unlocking a door of a vehicle from outside the vehicle, and transmit a request signal for starting up a motive power source of the vehicle to thereby place the motive power source in an operation state from outside the vehicle; a detection unit provided on the vehicle and configured to contactlessly detect the presence of a user located near the door; an authentication unit on the vehicle side that configured to perform authentication communication with the mobile device; a door driving unit provided on the vehicle and configured to put the door into an opened state when the door is in a locked state and the presence of the user is detected by the detection unit; and a power mode changeover switch provided on the vehicle and configured to, under authentication communication between the mobile device brought into the vehicle and the authentication unit, be switched among an OFF contact position, an ACC contact position (ACCESSORY contact position), an ON contact position, and a START contact position, wherein at the OFF contact position, supply of an electric power from an energy storage unit mounted in the vehicle to the vehicle is interrupted; at the ACC contact position, the electric power is supplied to an in-vehicle electric component; at the ON contact position, the electric power is supplied to the in-vehicle electric component, and the motive power source is kept in an operation state, while connection to the ACC contact position is established except when the motive power source is started up; and at the START contact position, the motive power source is started up.

When the motive power source is started up by using the mobile device from outside the vehicle, the power mode changeover switch is switched from the OFF contact position to the START contact position while avoiding the ACC contact position and the ON contact position, and the power mode changeover switch is maintained at the START contact position even after the motive power source is placed in the operation state. The detection unit includes a detection terminal that is connected to the ACC contact position of the power mode changeover switch, and when the electric power is not supplied from the energy storage unit to the detection terminal, the detection unit places itself in a state in which a detection operation is possible, and when the electric power is supplied, the detection unit places itself in a detection operation prohibition state.

By the above configuration, in a case where the motive power source such as an engine of the vehicle is started up by using the mobile device that transmits the request signal for starting up the motive power source such as the engine of the vehicle from outside the vehicle (from a location remote from the vehicle), the power mode changeover switch is switched from the OFF contact position to the START contact position while avoiding the ACC contact position and the ON contact position, and after the start-up, the power mode changeover switch is maintained at the START contact position.

Thus, when the motive power source is started up from outside the vehicle, the electric power is not supplied to the detection terminal that is connected to the ACC contact position. Therefore, the detection unit can be placed in a standby state in which a detection operation is possible. Accordingly, in this case, the user who has started up the motive power source by using the mobile device from outside the vehicle can open (either fully or partially) the door automatically using the detection unit.

On the other hand, in a case where the motive power source such as the engine of the vehicle is started up by the operation of the power mode changeover switch, the electric power is supplied to the detection terminal that is connected to the ACC contact position. Thus, under a circumstance where operation of opening/closing the door is not performed (for example, when the vehicle is traveling), the detection unit can be placed in a non-operation state.

In the above vehicle door opening/closing device, it is preferable that the detection unit includes an ultrasonic sensor located under the door of the vehicle and configured to detect the presence of a foot of the user, and after the motive power source of the vehicle is started up by using the mobile device from outside the vehicle and before the door is opened, the detection unit continues an operation of detecting the presence of the foot of the user and if the presence of the foot of the user is detected, the detection unit puts the door into an opened state through the door driving unit.

By the above structure, in a state in which the motive power source of the vehicle is started up by using the mobile device from outside the vehicle, the detection unit detects the presence of the foot of the user. Therefore, even in a case where the engine of the vehicle is started up by using the mobile device from a location remote from the vehicle, the door can be opened by using the detection unit.

That is to say, under a circumstance that the engine of the vehicle is in operation, if it is presumed that the user does not exist in the vehicle, the operation of detecting the presence of the foot of the user is performed. Therefore, when the user who has started the motive power source of the vehicle by using the mobile device from outside the vehicle wants to open the door, the user can open the door (put the door into the opened state) by moving his/her foot under the detection unit so that the presence of the foot is detected.

In the vehicle door opening/closing device, it is preferable that when the detection unit has detected the presence of the foot of the user and the door is put into the opened state, before starting to put the door into the opened state, the door driving unit performs authentication communication between the authentication unit and the mobile device, and if the authentication communication is successfully completed, the door is put into the opened state.

By the above structure, even if the detection unit is retrofitted as a retrofit option, the security is maintained because the existing door driving unit can put the door into the opened state under the authentication communication achieved by cooperation of the authentication unit and the mobile device.

In the above vehicle door opening/closing device, the mobile device configured to transmit the request signal for locking or unlocking the door of the vehicle from outside the vehicle, and transmit the request signal for starting up the motive power source of the vehicle to thereby place the motive power source in an operation state may be made up of two separate mobile devices including a first mobile device configured to transmit the request signal for locking or unlocking the door of the vehicle from outside the vehicle, and a second mobile device configured to transmit the request signal for starting up the motive power source of the vehicle to thereby place the motive power source in the operation state.

A detection unit according to another aspect of the present invention is provided on a vehicle and configured to contactlessly detect the presence of a user located near a door of the vehicle and open the door automatically if the presence of the user is detected, wherein: if a motive power source of the vehicle is driven by using a mobile device from outside the vehicle, an operation of detecting the presence of the user is continued; and if the motive power source of the vehicle is driven by the user performing a switching operation of a power mode changeover switch inside the vehicle, the operation of detecting the presence of the user is stopped.

By the above structure, the operation of detecting the presence of the user is continued in a case where the motive power source is driven from outside the vehicle; therefore, the door of the vehicle can be opened automatically by performing a motion (movement) to be detected by the detection unit.

In the above detection unit, it is preferable that the detection unit includes a detection terminal that is connected to an ACC terminal of the power mode changeover switch, and the detection unit determines whether to continue or stop the operation of detecting the presence of the user by the detection unit on the basis of an electric power supplied from the vehicle to the detection terminal through the ACC terminal.

By the above structure, when the motive power source is started up from outside the vehicle, the electric power is not applied to the detection terminal that is connected to the ACC terminal. Therefore, the detection unit can continue the detection operation. Accordingly, in this case, the user who has started the motive power source by the mobile device from outside the vehicle can open the door using the detection unit. On the other hand, in a case where the motive power source such as the engine of the vehicle is started up by the user's operation of the power mode changeover switch, the electric power is applied to the detection terminal that is connected to the ACC terminal; thus, the detection unit can be placed in a stopped state.

According to the present invention, in a case where the motive power source such as the engine of the vehicle is started up by using the mobile device that transmits the request signal for starting the motive power source such as the engine of the vehicle from outside the vehicle (from a location remote from the vehicle), the power mode changeover switch is switched from the OFF contact position to the START contact position while avoiding the ACC contact position and the ON contact position, and after the start-up, the power mode changeover switch is maintained at the START contact position.

Therefore, when the motive power source is started up from outside the vehicle, the electric power is not applied to the detection terminal that is connected to the ACC contact position. Therefore, the detection unit can be placed in the standby state in which the detection operation is possible. Accordingly, in this case, the user who has started the motive power source by the mobile device from outside the vehicle, that is, the user who wants to open the door can open the door using the detection unit.

On the other hand, in a case where the motive power source such as the engine of the vehicle is started up by the operation of the power mode changeover switch, the electric power is applied to the detection terminal that is connected to the ACC contact position. Thus, under a circumstance where operation of opening/closing the door is not performed (for example, when the vehicle is traveling), the detection unit can be placed in a non-operation state.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is an explanatory view of a conceivable scene where a detection unit is used;

DESCRIPTION OF THE PREFERRED EMBODIMENTS

A preferred embodiment of a vehicle door opening/closing device and a detection unit according to the present invention will hereinafter be described in detail with reference to the accompanying drawings.

[Configuration]

Figure 1:
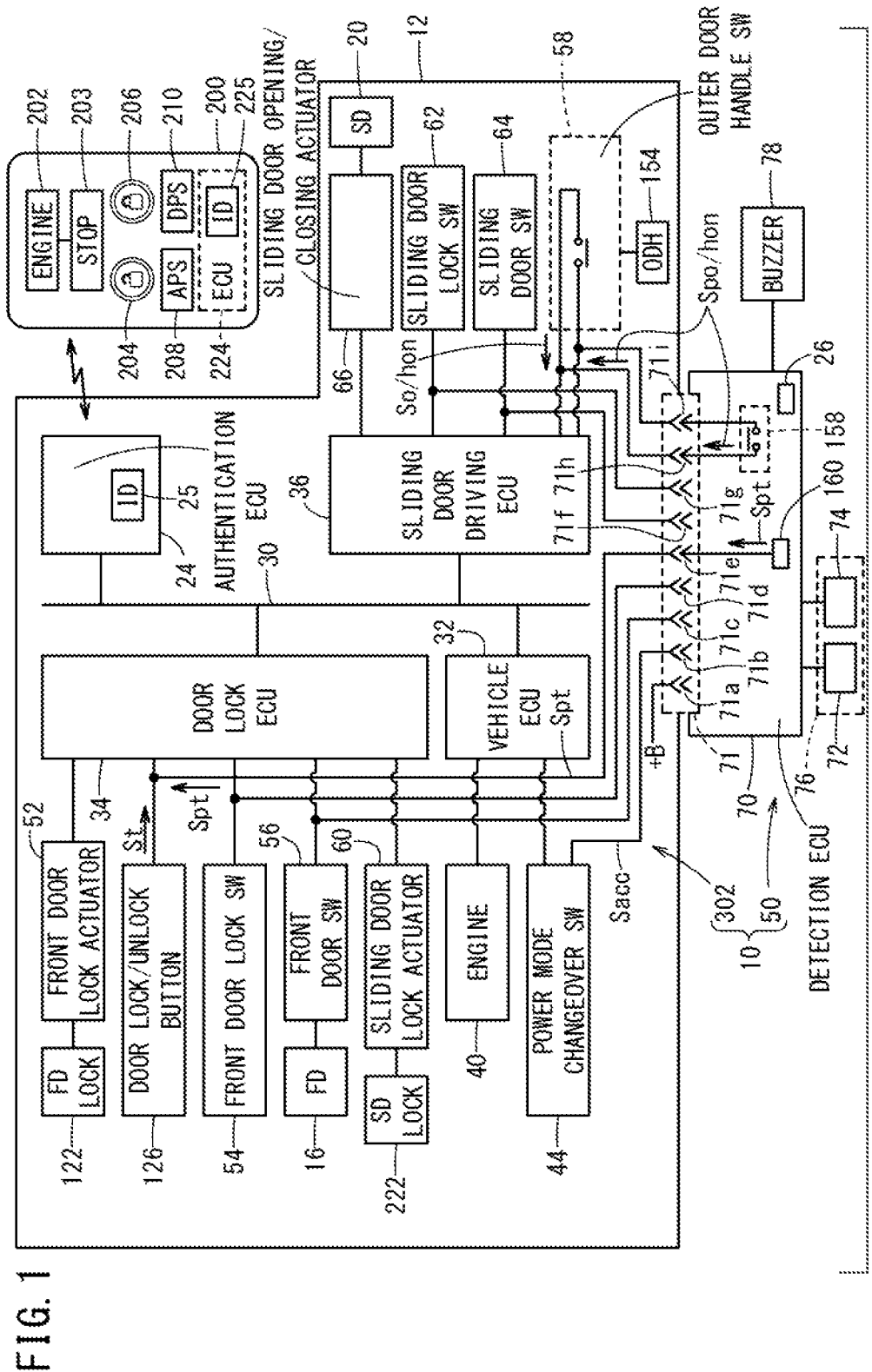
FIG. 1 is a schematic block diagram illustrating a vehicle door opening/closing device according to an embodiment of the present invention.

FIG. 1 is a schematic block diagram illustrating a vehicle door opening/closing device 10 according to this embodiment.

Figure 2A:
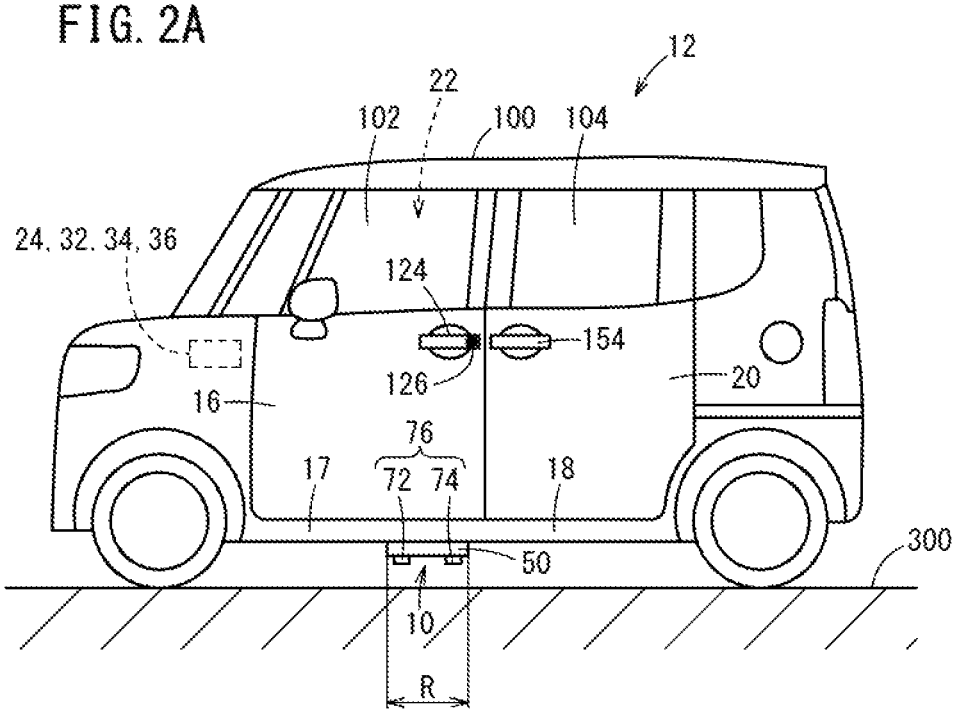
FIG. 2A is a schematic side view illustrating a state in which, for example, a sliding door is closed.
Figure 2B:
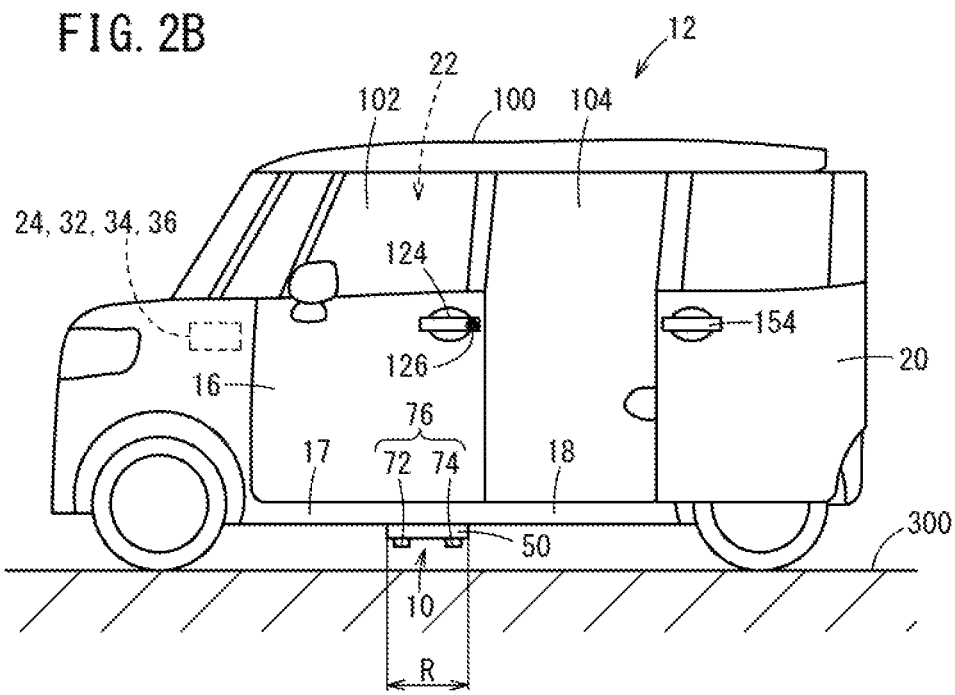
FIG. 2B is a schematic side view illustrating a state in which the sliding door is open.

For example, FIG. 2A is a schematic side view illustrating a state in which a sliding door (rear sliding door) 20 on the side of a passenger-side rear seat of a vehicle 12 with the steering wheel on the right side is closed, and FIG. 2B is a schematic side view illustrating a state in which the sliding door 20 of the vehicle 12 is open.

To avoid complication and facilitate understanding, in this embodiment, a configuration and an operation of the vehicle door opening/closing device 10 will be described by citing a front door 16 and the sliding door 20 on a passenger side of the vehicle 12 as an example. However, a configuration and an operation of a front door and a sliding door on the driver side are similar to those on the passenger side, and therefore are also included in the present invention.

As illustrated in FIG. 1, the vehicle door opening/closing device 10 basically includes a vehicle door opening/closing device main body 302 in the vehicle 12, a detection unit 50 according to this embodiment that is capable of contactlessly detecting the presence of a user (person), and a mobile device 200 that can be carried by the user.

As illustrated in FIG. 2A and FIG. 2B, the front door 16 of the vehicle 12 is a hinge-type door. The user manually opens and closes the hinge-type door while gripping a door handle 124 of the front door 16 (an outer door handle of the front door 16) to thereby open and close a front left opening 102 of a vehicle body 100.

On the other hand, the sliding door 20 of the vehicle 12 is a sliding-type door. When the user pulls an outer door handle (hereinafter may be abbreviated as ODH) 154 of the sliding door 20, a rear left opening 104 of the vehicle body 100 is opened.

Actually, the sliding door 20 is what is called a power sliding door that is electrically and automatically opened when, under a condition that the sliding door 20 is in a closed state and an unlocked state, a user pulls the outer door handle 154 of the sliding door 20 or the user presses an opening/closing button (APS) 208 of the mobile device 200 which is part of a smart key type entry system.

As will be described in detail below, the sliding door 20 according to this embodiment is controlled so that when the sliding door 20 is in the closed state and in the unlocked state, the sliding door 20 will not open even if the detection unit 50 detects insertion and withdrawal of the user's foot.

The smart key type entry system includes, as illustrated in FIG. 1, an authentication electronic control unit (ECU) (authentication control unit, authentication unit) 24 mounted on the vehicle, and the mobile device 200 carried by the user.

The authentication ECU 24 is a computing device including a micro-computer, and includes a central processing unit (CPU), a storage device (storage unit) 25 such as a ROM (including an EEPROM) or a random access memory (RAM), which is a memory, a timer serving as a time measuring unit (time measurement unit), and if necessary, an input/output device such as an A/D converter or a D/A converter, and the like. By the CPU reading out and executing programs stored in the ROM, the authentication ECU 24 serves as various function realizing unit (function realization unit, function realization means), such as a controller (control unit), a calculator (calculation unit), a processor (processing unit) or the like.

Other ECUs to be described below also have a configuration similar to that of the authentication ECU 24 described above.

The authentication ECU 24 further includes a transmission/reception circuit (not shown) configured to perform wireless authentication communications with the mobile device 200.

The mobile device 200 includes an ECU (mobile device ECU) 224, and this mobile device ECU 224 also serves as an authentication ECU (authentication control unit) of the mobile device 200. A storage device 225 (EEPROM) of the mobile device ECU 224 stores an ID for mutual authentication of the mobile device 200, and the same ID as the ID for the mutual authentication is also stored in advance in the storage device 25 (EEPROM) of the authentication ECU 24 of the vehicle 12.

The mobile device 200 includes an operation unit, which forms part of its external appearance, including an engine button 202, an engine stop button 203, an unlocking button (also referred to as unlock button) 204 for the front door 16 and the sliding door 20, a locking button (also referred to as lock button) 206 for the front door 16 and the sliding door 20, an opening/closing button 208 for the sliding door 20

(for the passenger's side), and an opening/closing button 210 (for the driver's side). A user can press the buttons. The mobile device 200 is also provided with, for example, an indicator such as an LED capable of being visually confirmed by the user or the like, and a buzzer and a speaker through which the user can listen to sound or voice, which are not shown.

Inside the mobile device 200, the mobile device ECU (also serving as authentication ECU (authentication control unit)) 224 is provided. The mobile device ECU 224 includes a transmission/reception circuit for performing wireless authentication communications with the authentication ECU 24 in the vehicle.

The engine button 202, the engine stop button 203, the unlock button 204, the lock button 206, and the opening/closing buttons 208, 210 are connected electrically to the mobile device ECU 224.

As is well known, as the user carrying the mobile device 200 approaches the front of the front door 16 of the vehicle 12, the smart key entry system is set to an unlock-standby mode for the front door 16 of the vehicle 12 or an unlock-standby mode for the sliding door 20 even though the user does not operate any button of the mobile device 200.

In order to automatically unlock the vehicle door (front door 16 or sliding door 20) in the unlock-standby mode, the user merely walks into a predetermined wireless frequency communication range of the vehicle 12 (mobile device detectable range 80 to be described later, which lies substantially in front of the front door 16) while carrying the mobile device 200 serving as an automatic responder. As a result, the authentication ECU 24 and the mobile device 200 perform authentication communications to determine whether the mutual IDs are the same.

After the authentication communication is successfully completed (i.e., the mutual IDs are the same), for example, if the user presses a door lock/unlock button 126 (door lock sensor) provided to the door handle 124 of the front door 16, then a front door lock 122 and a lock (sliding door lock) 222 of the sliding door 20 are unlocked. Thereafter, when the user pulls the door handle 124, the front door 16 is opened.

On the other hand, the sliding door 20 is automatically opened when the user pulls the outer door handle 154 (ODH) in a state that the sliding door 20 is unlocked, or when the user presses the opening/closing button 208 of the mobile device 200 in a state that the sliding door 20 is locked.

The vehicle door opening/closing device 10 includes, in addition to the authentication ECU 24, a vehicle ECU (vehicle control unit) 32, a door lock ECU (door lock control unit) 34, and a sliding door driving ECU (sliding door driving control unit (door driving unit)) 36 which are mutually connected through an in-vehicle communication line 30.

The detection unit 50 of the vehicle door opening/closing device 10 according to this embodiment is commercially available and is mounted as a retrofittable option (as a retrofit option) at a dealer or the like, not at a production factory line for the vehicle 12. However, the detection unit 50 may be mounted at the production factory line.

The detection unit 50 includes, as illustrated in FIG. 1, an ultrasonic sensor 76 including a pair of transducers 72, 74 with the same specification, a buzzer 78, and a detection ECU (detection control unit) 70.

The transducers 72, 74 are arranged along a vehicle length direction of the vehicle 12 as illustrated in FIG. 2A, FIG. 2B, and FIG. 3. The transducers 72, 74 are of a two-way type (transmittable and receivable) configured so as to switch between transmission and reception of ultrasonic waves at a predetermined period (for example, every several hundred milliseconds). The transducers 72, 74 are advantageous in having a longer usable period than a device for transmission only or a device for reception only. In these drawings, reference sign R denotes a detection range (detection area) within the ultrasonic sensor 76 can detect a signal.

The detection unit 50 is electrically connected to the vehicle door opening/closing device main body 302 in the vehicle 12 with a wire through a connector 71. In addition, as illustrated in FIG. 2A and FIG. 2B, the detection unit 50 is fixed, with a fastening member (not shown), to the vehicle body 100 on a lower side of the front door 16 (under a front side sill 17) near a lower side of the sliding door 20 (rear side sill 18) so that insertion and withdrawal of the left foot F of a user M under the vehicle can be easily detected.

FIG. 3 is an explanatory view of a conceivable scene where the detection unit 50 is used. The detailed operation related to the detection unit 50 will be described later.

For example, in a state that the front door 16 and the sliding door 20 of the vehicle 12 parked on a ground 300 are locked, the user M who carries the mobile device 200 in his/her pocket of the clothes, etc., and holds a package B with his/her arms inserts his/her left foot F into a gap under the vehicle body so as to place the foot F under the ultrasonic sensor 76 (i.e., within a predetermined detection range R) mounted on the lower side of the front door 16 (under the front side sill 17) (step a).

Next, the user M withdraws his/her left foot F from under the ultrasonic sensor 76 (from the predetermined detection range R between the ultrasonic sensor 76 and the ground 300) within several seconds. The detection of the inserting and withdrawing motion of the left foot F {referred to as kicking operation (kick motion)} triggers the start of authentication communication between the mobile device 200 (the mobile device ECU 224 of the mobile device 200) and the authentication ECU 24 (step b).

In fact, the detection of the inserting and withdrawing motion of the left foot F or the like by the ultrasonic sensor 76 is performed as follows. Initially, an ultrasonic wave 77 (transmission wave) transmitted from one transducer 72 is reflected from the ground 300. By the inserting and withdrawing motion of the left foot F, this reflection from the ground 300 is changed into a reflection from the left foot F or the like, and thereafter the reflection from the left foot F is returned to the reflection from the ground 300. Whether this process has occurred within several seconds (predetermined time) is determined by monitoring a state (return-back time) of the ultrasonic wave 77 (reflected wave) with the other transducer 74.

After the authentication in step b is successfully completed, the front door 16 and the sliding door 20 are changed from the locked state to the unlocked state so that the sliding door 20 is automatically opened.

The user M with the package B in his/her arms can set the package B down in a vehicle room 22 to load the vehicle 12 with the package B (step c).

After setting the package B down in the vehicle room 22, the user M who has determined that the loading of the package B is completed performs the aforementioned kick motion (with either right foot or left foot F) (step b again).

Detection of this kick motion triggers the automatic closing of the sliding door 20. After that, the authentication communication between the mobile device 200 (mobile device ECU 224 of the mobile device 200) and the authentication ECU 24 is performed and if the authentication is successfully completed, the sliding door 20 is locked. At this time, all the doors including the front door 16 are locked.

In this case, the detection unit 50 (ultrasonic sensor 76) is provided under the front door 16 (under the front side sill 17). Therefore, even if the foot (left foot F or right foot) of the user M is placed under the rear side sill 18 (under the rear left opening 104) during the loading/unloading work of the package B, the foot is out of the detection range R of the ultrasonic sensor 76, and thus the sliding door 20 is kept open. Therefore, it is possible to eliminate the concern that the sliding door 20 might be closed against the user's will while the user is loading or unloading the package B, and thus the load and unload work for the package B can be performed smoothly.

Back to FIG. 1, an engine 40 as a motive power source of the vehicle 12 and a power mode changeover switch 44 that can switch a power mode under the authentication with the mobile device 200 located within the predetermined range from the vehicle room 22 are connected to the vehicle ECU 32. The power mode changeover switch 44 approximately corresponds to a conventional ignition switch. The motive power source of the vehicle 12 may be a fuel cell instead of the engine 40.

Figure 4:
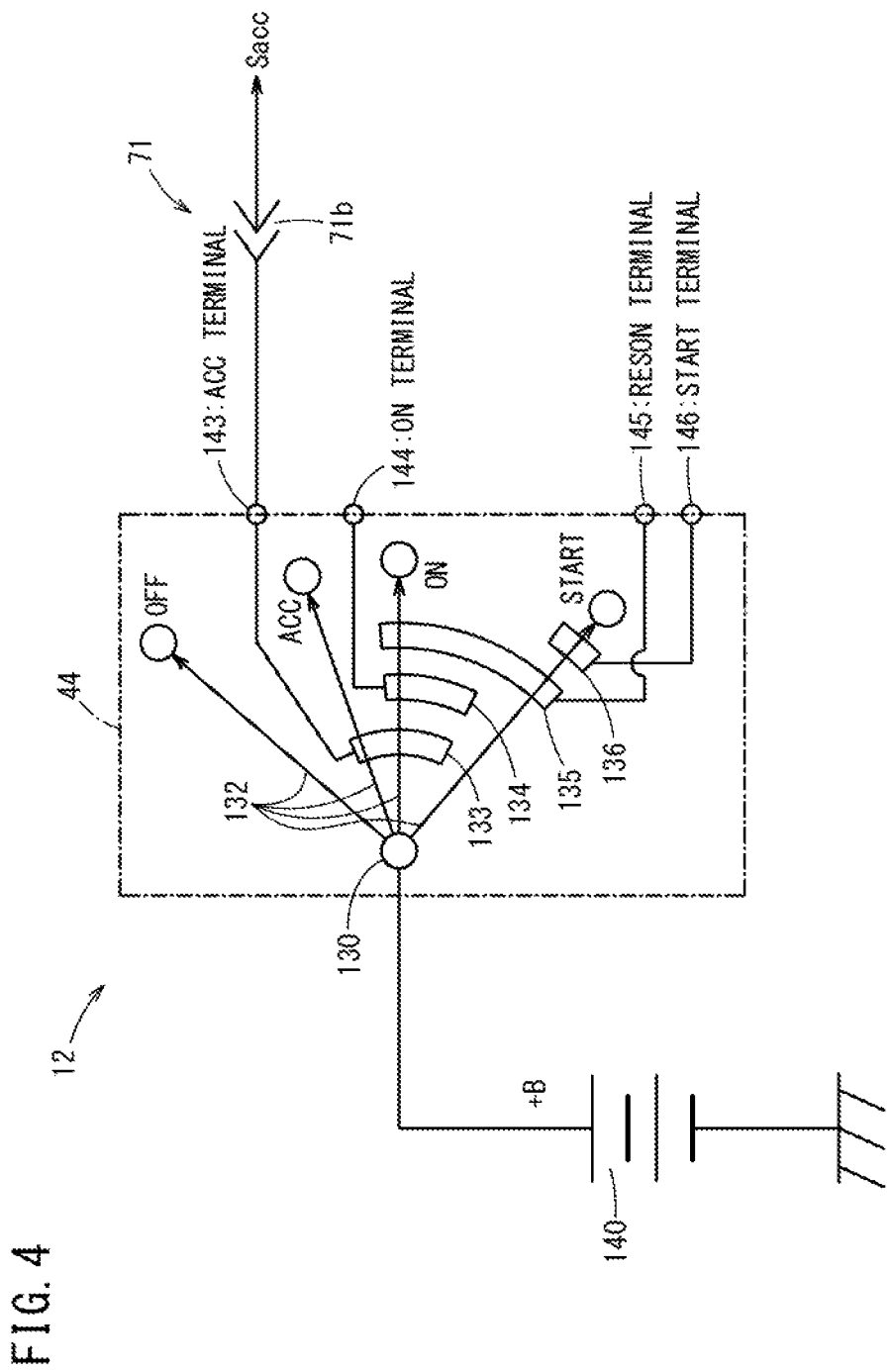
FIG. 4 is an explanatory view of a circuit configuration of a power mode changeover switch.

FIG. 4 is an explanatory view of a circuit configuration of the power mode changeover switch 44 (power mode changeover button) that is disposed on an instrument panel that is not shown. An actual circuit includes a relay whose switching position of a movable contact is arbitrarily selectable; however, in order to facilitate understanding, description will be made of a circuit configuration of a rotary switch with a function of a conventional ignition switch.

The power mode changeover switch 44 is a press button switch, and every time the button is pressed, function modes can be alternatively selected (switched) in the following order repeatedly: an off mode (in which all the electric power sources are off, and which is also referred to as OFF mode)→an accessory mode (a mode in which in-vehicle electric components such as an audio system can be used, and this mode is also referred to as ACC mode (ACCESSORY mode))→an on mode (also referred to as ON mode) in which the vehicle is in operation, wherein the on mode is effected after a start mode (START mode) for starting up the engine 40 (START)→the off mode.

The power mode changeover switch 44 includes a common terminal 130, one movable contact 132, fixed contacts OFF, ACC, ON, and START, and sections 133, 134, 135, 136. To the section 133, an ACC terminal (ACCESSORY terminal) 143 is connected, and to the section 134, an ON terminal 144 is connected. To the section 135, a remote engine start (RES) ON terminal 145 is connected, and to the section 136, a START terminal 146 is connected.

When the movable contact 132 is at the fixed contact OFF, the voltage (also referred to as electric power +B or electric energy +B) of an energy storage unit (e.g., battery) 140 mounted in the vehicle is not connected to the electric components or the like.

When the movable contact 132 is at the fixed contact ACC, the electric power +B is supplied from the common terminal 130 to the ACC terminal 143 through the movable contact 132 and the section 133. To the ACC terminal 143, in addition to the in-vehicle electric components (not shown), a terminal 71b of a connector 71 of the detection unit 50 is connected through a wire. A signal of the voltage at the ACC terminal 143 is called an ACC signal Sacc. When the ACC terminal 143 is connected to the energy storage unit 140 through the section 133, the movable contact 132, and the common terminal 130, the ACC signal Sacc has the voltage of the electric power +B (the voltage is also referred to as +B) of a nominal value of +12 [V] (high level). When the section 133 is not connected to the movable contact 132, the ACC signal Sacc is grounded through a resistor (not shown) and has a voltage 0 [V] (low level).

When the movable contact 132 is at the fixed contact ON, the electric power +B is supplied to the ON terminal 144 through the section 134, and the electric power +B is also supplied to the ACC terminal 143 through the section 133 and moreover the electric power +B is supplied to a RESON terminal 145 through the section 135. When the sections 134, 135 are not connected to the movable contact 132, the sections 134, 135 are grounded through a resistor (not shown) via the ON terminal 144 and the RESON terminal 145, and the voltages of the sections 134, 135 become 0 [V].

When the movable contact 132 is at the fixed contact START, the electric power +B is supplied to the RESON terminal 145 through the section 135, and the electric power +B is supplied to the START terminal 146 through the section 136. When the section 136 is not connected to the movable contact 132, the section 136 is grounded through a resistor (not shown) via the START terminal 146, so that the voltage is 0 [V].

Here, the following three points should be noted.

First, in a case that the power mode changeover switch 44 is pressed within the vehicle room 22, when the authentication communication with the mobile device 200 located within the vehicle room 22 is successfully completed so that the movable contact 132 is connected to the fixed contact START, the engine 40 is cranked by an unillustrated cranking motor to thereby be started up, and thereafter the movable contact 132 is returned to the fixed contact ON by the vehicle ECU 32. Note that during the operation after the start-up of the engine 40, the supply of electric power to the cranking motor is stopped.

Secondly, in a case that the engine button 202 of the mobile device 200 is pressed outside the vehicle 12, when the authentication communication with the mobile device 200 located outside the vehicle is successfully completed, the vehicle ECU 32 takes control so as to move the movable contact 132 from the position of the fixed contact OFF to the fixed contact START while avoiding the fixed contact ACC (ACCESSORY) and the fixed contact ON, and then connect the movable contact 132 directly to the fixed contact START. Thus, the engine 40 is cranked and started up, and thereafter the movable contact 132 is maintained at the fixed contact START. Note that during the operation after the engine 40 has been started up, the supply of electric power to the cranking motor is stopped.

Thirdly, in a case where the engine 40 is started by using the mobile device 200 from the outside and the engine 40 is placed in the operation state, for example, if the unlock button 204 of the mobile device 200 is operated from outside the vehicle, and the locks 122, 222 are unlocked after the successful authentication communication, then the vehicle ECU 32 switches the connection of the movable contact 132 from the fixed contact START to the fixed contact OFF, and stops the engine 40.

Back to FIG. 1, the door lock ECU 34 is connected to a front door lock actuator 52 that locks and unlocks the lock 122 of the front door 16 (front door lock, FD lock), a door lock/unlock button 126, a front door lock switch 54 that detects a state of the front door lock 122 (whether the front door lock 122 is in a locked state or an unlocked state), a front door switch 56 that detects the opened/closed state of the front door (FD) 16, and a sliding door lock actuator 60 that locks and unlocks the lock 222 of the sliding door 20 (SD lock).

The door lock/unlock button 126 incorporated in the door handle 124 (see FIG. 2A, FIG. 2B), when pressed, outputs a door lock trigger signal St. When the front door 16 and the sliding door 20 are in the locked state, the door lock trigger signal St serves as an unlock signal for the front door 16 and the sliding door 20. When the front door 16 and the sliding door 20 are in the closed and unlocked state, the door lock trigger signal St serves as a lock signal for the front door 16 and the sliding door 20.

To the sliding door driving ECU 36, there are connected an outer door handle switch 58, a sliding door lock switch 62, a sliding door switch 64, and a sliding door opening/closing actuator 66. The outer door handle switch 58 causes the closed state and outputs an outer door handle switch on signal So/hon when the user M pulls the outer door handle 154 (see FIG. 2A, FIG. 2B) by hand (when the outer door handle 154 is not pulled, the opened state is established and the outer door handle switch on signal So/hon is not output). The sliding door lock switch 62 detects a state of the lock 222 of the sliding door 20 (SD lock) (whether the lock 222 is in a locked state or an unlocked state). The sliding door switch 64 detects an opened/closed state of the sliding door 20. The sliding door opening/closing actuator 66 operates to open or close the sliding door (SD) 20.

The detection ECU 70 includes a timer 26 as a time measuring unit, and is connected to the ultrasonic sensor 76 including the transducers 72 and 74, the buzzer 78, and the connector 71 as an electric component for electrically connecting wires to each other. The connector 71 includes nine terminals (detection terminals) 71a to 71i.

The terminal 71a is a terminal through which the electric power +B is supplied from the energy storage unit 140 mounted in the vehicle 12 to the detection unit 50.

The terminal 71b is connected to the ACC terminal 143 (see FIG. 4), and is used to detect, by the detection ECU 70, the voltage (electric power +B or 0 [V]) of the ACC terminal 143 on the basis of the voltage level of the ACC signal Sacc, and based on the detected voltage, place the detection unit 50 in a kick detection mode state (kick detectable state) or a kick detection prohibition mode state.

The terminal 71c is connected to the front door switch 56 and is used to detect the opened/closed state of the front door 16 by the detection ECU 70.

The terminal 71d is connected to the front door lock switch 54 and is used to detect the locked/unlocked state of the front door 16 by the detection ECU 70.

The terminal 71e is connected to the door lock/unlock button 126. A quasi door lock trigger signal Spt, which is equivalent to the door lock trigger signal St, is output from the detection ECU 70 through the terminal 71e. The terminal 71e is connected to a generation unit 160 that generates the quasi door lock trigger signal Spt in the detection ECU 70.

The terminal 71f is connected to the sliding door switch 64 and is used to detect the opened/closed state of the sliding door 20 by the detection ECU 70.

The terminal 71g is connected to the sliding door lock switch 62, and is used to detect the locked/unlocked state of the lock 222 of the sliding door 20 by the detection ECU 70.

The terminals 71h, 71i are connected to an outer door handle switch (ODH switch) 158 in the detection ECU 70. The ODH switch 158 has a function equivalent to the function of the outer door handle switch 58 described above, and is an electronic switch formed of a semiconductor element. The outer door handle switch 158 functions as a generation unit that generates and outputs a quasi outer door handle switch on signal (quasi ODH switch on signal) Spo/hon when the outer door handle switch 158 is turned on by the detection ECU 70 under a predetermined condition to be described later.

This quasi outer door handle switch on signal Spo/hon is a quasi signal equivalent to the outer door handle switch on signal So/hon output from the outer door handle switch 58 (see FIG. 1) when the user M pulls the outer door handle 154 (see FIG. 2A, FIG. 2B) by hand.

[Operation]

Figure 5:
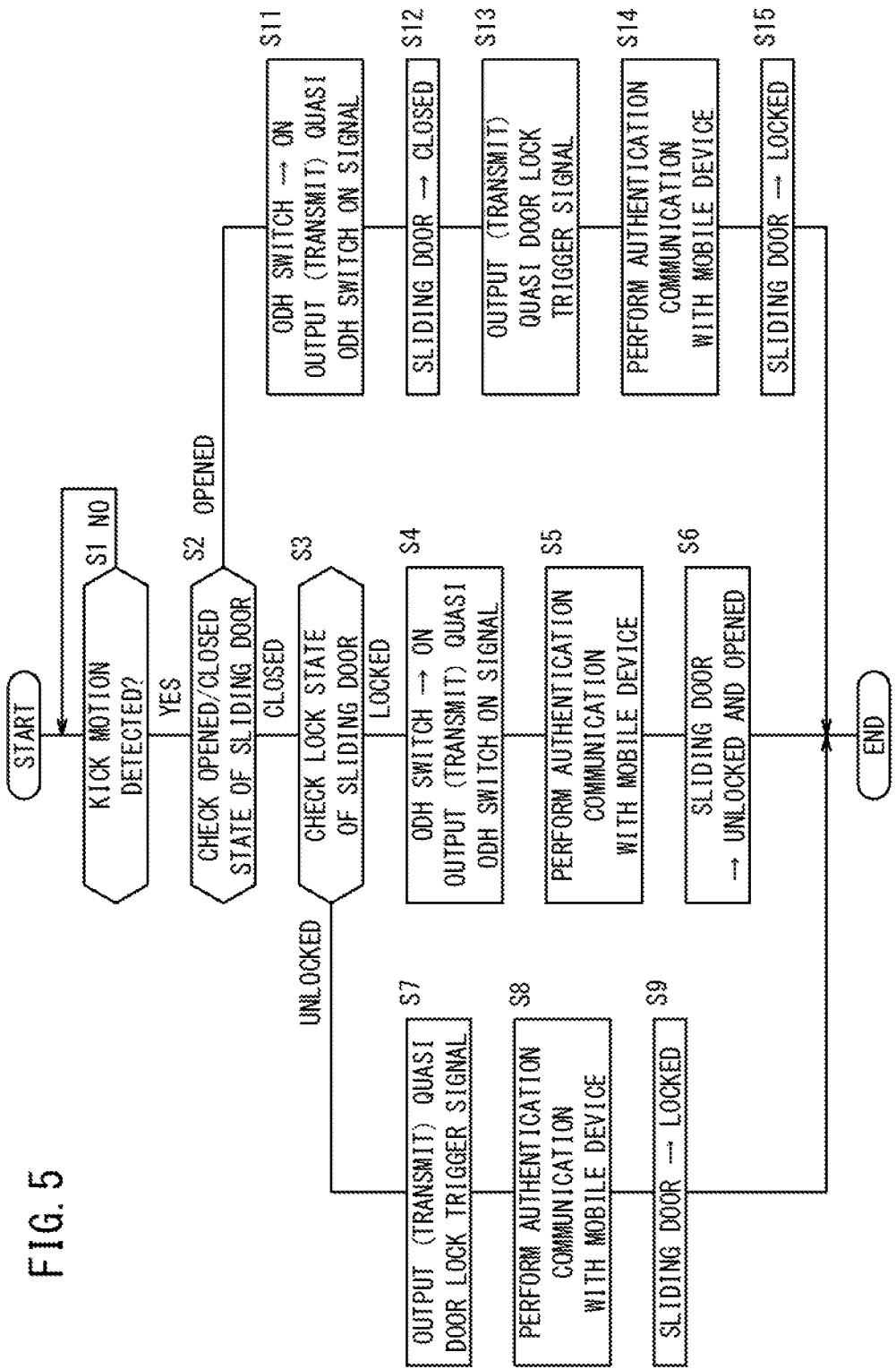
FIG. 5 is a flowchart for specifically describing an operation of a vehicle door opening/closing device.
Figure 6:
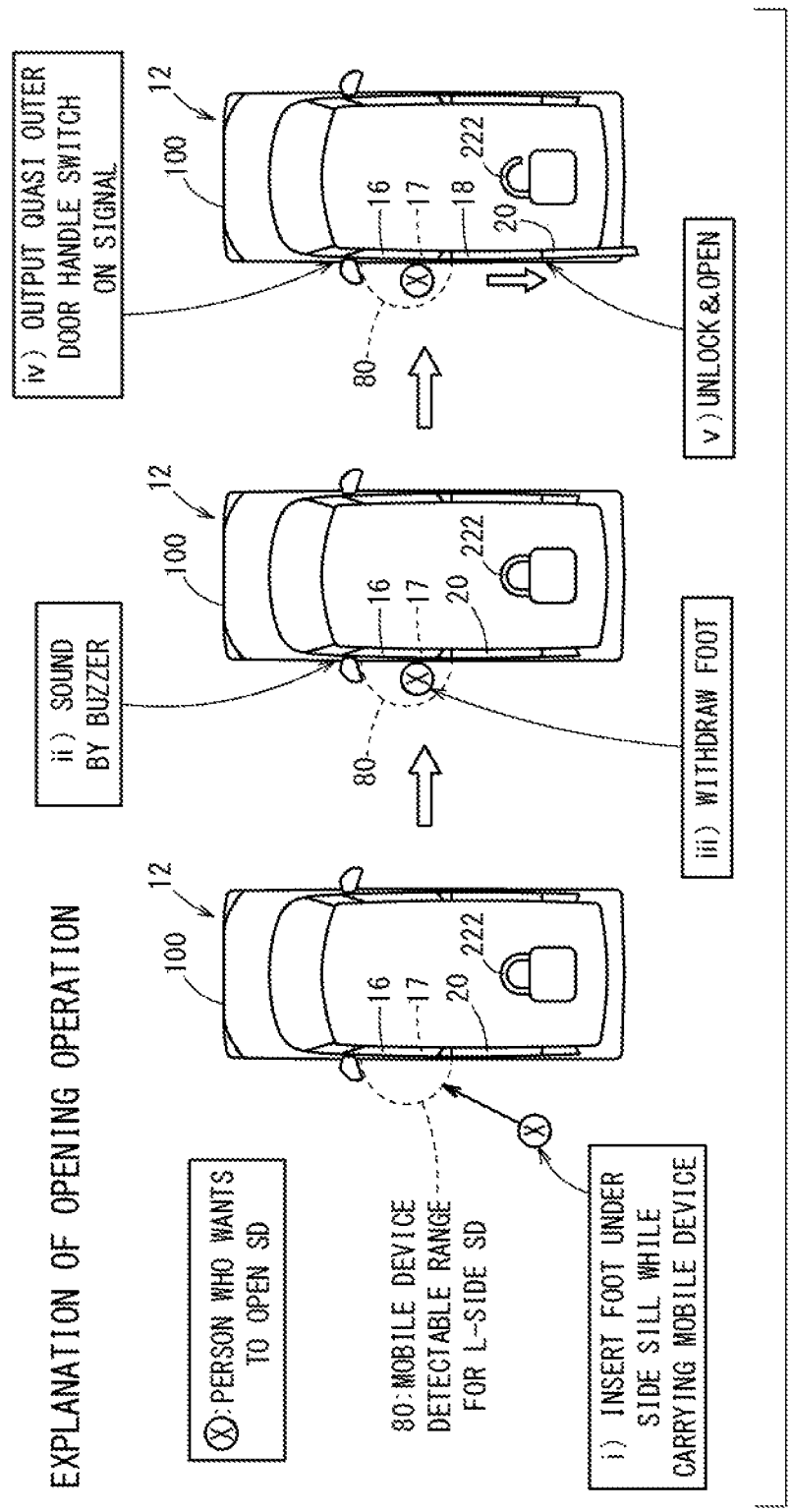
FIG. 6 is a diagram for describing an operation when the sliding door is changed from a locked state to an unlocked and opened state.
Figure 7:
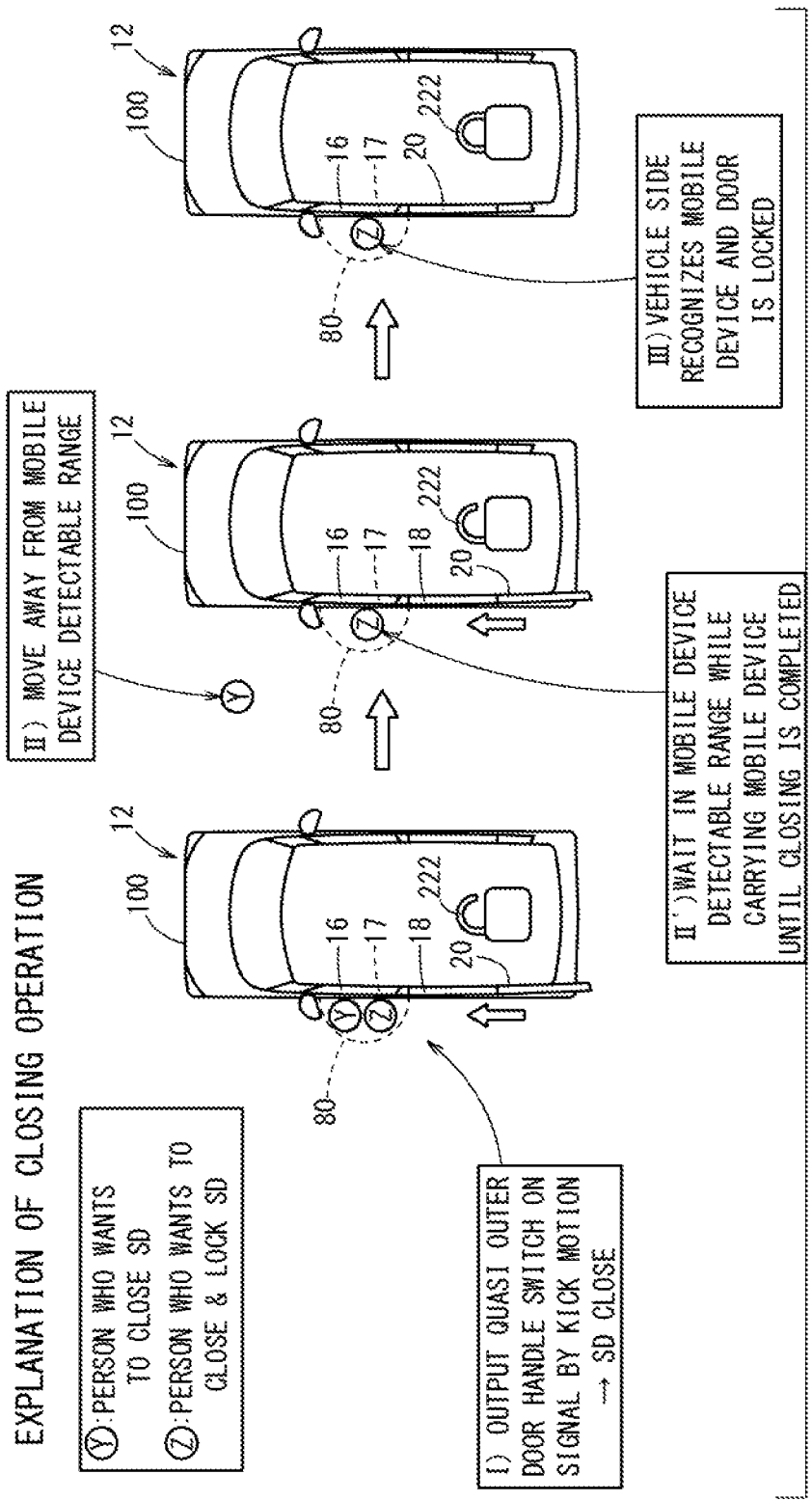
FIG. 7 is a diagram for describing an operation when the sliding door is changed from an opened state to a closed state and when the sliding door is changed from the opened state to a closed and locked state.
Figure 8:
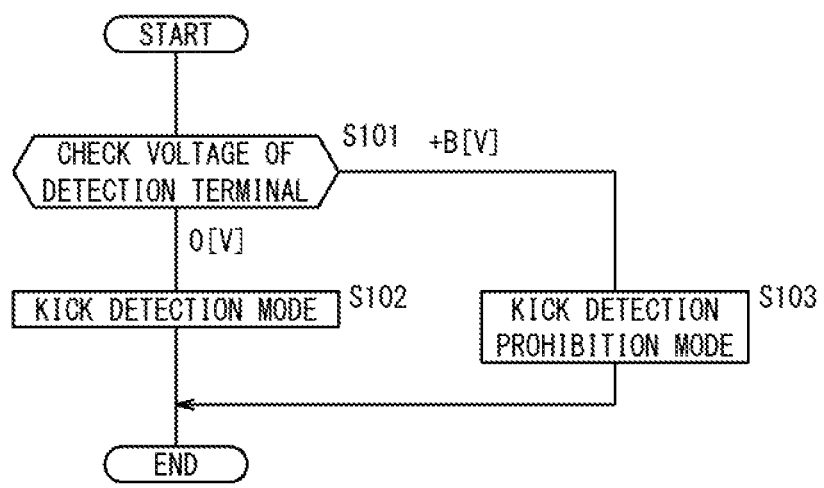
FIG. 8 is a flowchart for describing an operation of the detection unit.

Next, a detailed operation of the vehicle door opening/closing device 10 that is basically configured and operated as above is described with reference to FIG. 5, FIG. 6, FIG. 7, and FIG. 8 in the order of the following (1) to (4). FIG. 5 is a flowchart of an operation (opening/closing operation and lock/unlock operation) of the sliding door 20 that is performed in cooperation with the detection unit 50 and the vehicle door opening/closing device main body 302. FIG. 6 is a diagram for describing an operation performed when the sliding door 20 (SD) transitions from the locked (LOCK) state to the unlocked (UNLOCK) and opened (OPEN) state. FIG. 7 is a diagram for describing an operation performed when the sliding door 20 transitions from the opened (OPEN) state to the closed (CLOSE) state and when the sliding door 20 transitions from the opened (OPEN) state to the closed (CLOSE) and locked (&LOCK) state. FIG. 8 is a flowchart in which it is determined whether the detection unit 50 should be in operation or in non-operation.

(1) Process for transition of the sliding door from the closed and locked state to the opened and unlocked state;
(2) Process for transition of the sliding door from the closed and unlocked state to the closed and locked state;
(3) Process for transition of the sliding door from the opened and unlocked state to the closed and locked state; and
(4) Process of determining the operation or the non-operation of the detection unit 50.

[Operation of Sliding Door 20 in Cooperation with Detection Unit 50 and Vehicle Door Opening/Closing Device Main Body 302]

<(1) Process for Transition of Sliding Door from Closed and Locked State to Opened and Unlocked State>

In step S1, the detection ECU 70 determines whether detection of kicking has occurred (whether the kick motion has been detected).

As illustrated in FIG. 6, in the kick detection, the kick motion is detected when: within the mobile device detectable range 80 of the sliding door 20 (L-side SD), i) a person X who wants to open the sliding door 20 (SD) inserts his/her foot (right foot or left foot F) under the ultrasonic sensor 76 located under the front side sill 17 while carrying the mobile device 200; ii) the detection unit 50 causes the buzzer 78 to produce sound; and iii) the person X withdraws his/her foot from under the ultrasonic sensor within several seconds (step S1: YES). Note that, in this embodiment, the mobile device detectable range 80 of the sliding door 20 is provided substantially in front of the front door 16.

Next, in step S2, the detection ECU 70 acquires a detection result concerning the opened/closed state of the sliding door switch 64 through the terminal 71f, and determines whether the sliding door 20 is in the opened or closed state.

Here, suppose that the sliding door 20 is in the closed state (step S2: closed).

Next, in step S3, the detection ECU 70 acquires a detection result concerning the locked/unlocked state of the sliding door lock switch 62 through the terminal 71g and detects the locked/unlocked state of the sliding door 20.

Here, suppose that the sliding door 20 is in the locked state (step S3: locked).

In this case, the detection ECU 70 turns on (ON) the outer door handle switch 158 in step S4. Thus, from the terminals 71h, 71i of the detection ECU 70 connected to the outer door handle switch 158 of the detection unit 50, iv) the quasi outer door handle switch on signal Spo/hon is output and is then input to the sliding door driving ECU 36.

Next, in step S5, upon input of the quasi outer door handle switch on signal Spo/hon, an authentication request from the sliding door driving ECU 36 is transmitted to the authentication ECU 24 through the in-vehicle communication line 30 (hereinafter the description of the in-vehicle communication line 30 is omitted), and the authentication ECU 24 having received the quasi outer door handle switch on signal Spo/hon performs the authentication communication with the mobile device 200. In this case, when the IDs stored in the respective storage devices 25, 225 agree with each other, the authentication is successfully completed, and the result of the successful authentication from the authentication ECU 24 is notified to the sliding door driving ECU 36.

At this time, in step S6, v) the sliding door driving ECU 36 unlocks the lock 222 by the sliding door lock actuator 60 through the door lock ECU 34 and thereafter puts the sliding door 20 into the opened state through the sliding door opening/closing actuator 66 (see the right-hand side in FIG. 6).

The aforementioned process {step S1: YES→step S2: closed→step S3: locked→step S4: Spo/hon signal output-→step S5: authentication communication→step S6: open} corresponds to a process (referred to as a first route process) to bring the sliding door 20 from the closed and locked state to the unlocked and opened state when the user X performs the kick motion.

<(2) Process for Transition of Sliding Door from Closed and Unlocked State to Closed and Locked State>

On the other hand, in step S3 described above, in the case that the detection ECU 70 determines that the currently-closed sliding door 20 is in the unlocked state, even though the first kick motion is performed in step S1, the sliding door 20 will not open immediately.

Therefore, in step S7, the detection ECU 70 outputs the quasi door lock trigger signal Spt from the generation unit 160 through the terminal 71e, and transmits the signal to the door lock ECU 34.

Next, in step S8, upon input of the quasi door lock trigger signal Spt, the authentication request from the door lock ECU 34 is transmitted to the authentication ECU 24. At this time, the authentication ECU 24 performs the authentication communication with the mobile device 200. In this case, if the IDs stored in the respective storage devices 25, 225 agree with each other, the authentication is successfully completed, and the result of the successful authentication from the authentication ECU 24 is notified to the door lock ECU 34.

Next, in step S9, the door lock ECU 34 locks the lock 222 through the sliding door lock actuator 60 on the basis of the result of the successful authentication.

The aforementioned process {step S1: YES→step S2: closed→step S3: unlocked→step S7: Spt signal output-→step S8: authentication communication→step S9: locked} corresponds to a process (referred to as a second route process) to cause the sliding door 20 that is closed and unlocked to be locked by the kick motion performed by the user X.

If the kick motion is detected again in step S1 (the second kick motion) after step S9, the sliding door 20 transitions from the closed and locked state to the unlocked and opened state according to the aforementioned first route process.

<(3) Process for Transition of Sliding Door from Opened and Unlocked State to Closed and Locked State>

In step S1, the detection ECU 70 determines whether detection of kicking has occurred (whether the kick motion has been detected).

As illustrated in FIG. 7, it is determined that the kick motion has been detected when, within the mobile device detectable range 80 of the sliding door 20 (L-side SD), a person Y who wants to close (CLOSE) the sliding door 20 (SD) or a person Z who wants to close and lock (CLOSE & LOCK) the sliding door 20 performs the following operation I): the person Y or the person Z carrying the mobile device 200 inserts and withdraws his/her foot (right foot or left foot F) under the ultrasonic sensor 76 located under the front side sill 17 (performs the kick motion) (step S1: YES). In this case, the detection unit 50 causes the buzzer 78 to produce sound.

In this case as well, if it is determined that the sliding door 20 is in the opened state (the lock 222 is unlocked, of course) on the basis of a detection result concerning the opened/closed state of the sliding door switch 64 by the detection ECU 70 in step S2, the detection ECU 70 turns on (ON) the outer door handle switch 158 in step S11. Thus, I) the quasi outer door handle switch on signal Spo/hon is output from the outer door handle switch 158, and then input to the sliding door driving ECU 36.

Next, in step S12, the sliding door driving ECU 36 puts the sliding door 20 into the closed state by using the sliding door opening/closing actuator 66.

II) The person Y who wants to close (CLOSE) the sliding door 20 (SD) moves outward from the mobile device detectable range 80 while carrying the mobile device 200, before the process for placing the sliding door 20 in the closed state is completed.

On the other hand, II') the person Z who wants to close and lock the sliding door 20 waits in the mobile device detectable range 80 while carrying the mobile device 200, until the sliding door 20 is closed (CLOSE operation is completed).

When the detection ECU 70 detects that the sliding door 20 is closed based on the state of the sliding door switch 64, the detection ECU 70 outputs the quasi door lock trigger signal Spt from the generation unit 160 and transmits the signal to the door lock ECU 34 in step S13 in a manner similar to the processes in steps S7, S8, S9 described above.

Next, in step S14, the authentication request of the door lock ECU 34 is transmitted to the authentication ECU 24 and the authentication ECU 24 performs the authentication communication with the mobile device 200. When the IDs stored in the respective storage devices 25 and 225 agree with each other, the authentication is successfully completed, and the result of the successful authentication from the authentication ECU 24 is notified to the door lock ECU 34.

At this time, in step S15, the door lock ECU 34 locks the lock 222 through the sliding door lock actuator 60.

The aforementioned process {step S1: YES→step S2: opened→step S11: Spo/hon signal output→step S12: sliding door closed→step S13: Spt signal output→step S14 authentication communication→step S15: locked} corresponds to a process (referred to as a third route process) to bring the sliding door 20 from the opened and unlocked state into the closed and locked state when the user Z performs the kick motion.

Even if the detection unit 50 is retrofitted as a retrofit option, the security is maintained in any of the first to third route processes because the sliding door 20 can be opened/closed and locked/unlocked under the existing authentication communication between the mobile device 200 and the authentication ECU 24 (steps S5, S8, S14).

<(4) Process of Determining Operation or Non-Operation of Detection Unit 50>

Next, in step S101 in FIG. 8, the detection ECU 70 detects the ACC signal Sacc through the terminal 71b, which is a detection terminal, and checks the voltage. If Sacc=+B, it is determined that connection of the movable contact 132 of the power mode changeover switch 44 has been switched to the fixed contact ACC or the fixed contact ON in the vehicle 12, and thus it is determined that there is an occupant in the vehicle 12. Then, the kick detection prohibition mode is set (kick motion is disabled) in step S103.

On the other hand, if the ACC signal Sacc is 0 [V], connection of the movable contact 132 has been switched to the fixed contact OFF or the fixed contact START, and thus it is determined that no occupant is in the vehicle 12. Then, the kick detection mode is set (kick motion is enabled) in step S102.

SUMMARY AND MODIFICATIONS

The vehicle door opening/closing device 10 according to the aforementioned embodiment includes: the mobile device 200 configured to transmit a request signal (via radio waves) for locking and unlocking the locks 122, 222 of the doors (front door 16 and sliding door 20) of the vehicle 12 from outside the vehicle 12, and transmit a request signal (via radio waves) for starting up the engine 40, which is the motive power source of the vehicle 12, to thereby place the engine 40 in the operation state from outside the vehicle 12; the detection unit 50 provided on the vehicle 12 and configured to contactlessly detect the presence of the user M located near the door (the front door 16 in the above embodiment); the authentication ECU (authentication unit) 24 on the vehicle 12 side, configured to perform the authentication communication with the mobile device 200; the sliding door driving ECU 36 serving as the door driving unit provided on the vehicle 12 and configured to put the door (in the above embodiment, the sliding door 20) into the opened state (including a fully-opened state or a partially-opened state) when the doors (front door 16 and sliding door 20) are in the locked state and the detection unit 50 has detected the presence of the user M based on the kick movement (kick motion) of his/her foot (left foot F or right foot); and the power mode changeover switch 44 provided on the vehicle 12 and configured to, under the authentication communication between the authentication ECU 24 and the mobile device 200 brought into the vehicle 12, be switched among the fixed contact OFF (OFF contact position), the fixed contact ACC (ACCESSORY contact position), the fixed contact ON (ON contact position), and the fixed contact START (START contact position), wherein at the fixed contact OFF, supply of an electric power (+B) from the energy storage unit 140 mounted in the vehicle 12 to the vehicle 12 is interrupted; at the fixed contact ACC, the electric power +B is supplied to an in-vehicle electric component; at the fixed contact ON, the electric power +B is supplied to the in-vehicle electric component, and the engine 40 is kept in an operation state, while connection to the fixed contact ACC (ACCESSORY contact position) is established except when the engine 40 is started up; and at the fixed contact START, the engine 40 is started up.

In this case, when the engine 40 is started up by using the mobile device 200 from outside the vehicle 12, the power mode changeover switch 44 is switched from the fixed contact OFF (OFF contact position) to the fixed contact START (START contact position) while avoiding the fixed contact ACC (ACC contact position) and the fixed contact ON (ON contact position), and the power mode changeover switch 44 is maintained at the fixed contact START (START contact position) even after the engine 40 is placed in the operation state.

The detection unit 50 includes the detection terminal 71b that is connected to the fixed contact ACC (ACC contact position) of the power mode changeover switch 44. When the electric power +B is not supplied from the energy storage unit 140 to the detection terminal 71b (step S101: 0 [V]), the detection unit 50 places itself in a state in which a detection operation is possible (step S102: kick detection mode), and when the electric power +B is supplied (step S101: +B), the detection unit 50 places itself in a detection operation prohibition state (step S103: kick detection prohibition mode).

Thus, in a case where the motive power source such as the engine 40 of the vehicle 12 is started up by using the mobile device 200 that transmits a request signal for starting the motive power source such as the engine 40 of the vehicle 12 from outside the vehicle 12 (from a location remote from the vehicle 12), the power mode changeover switch 44 is switched from the fixed contact OFF (OFF contact position) to the fixed contact START (START contact position) while avoiding the fixed contact ACC (ACC contact position) and the fixed contact ON (ON contact position), and after the start-up, the power mode changeover switch 44 is maintained at the fixed contact START (START contact position).

Therefore, when the engine 40 is started up from outside the vehicle 12, the electric power +B is not applied to the detection terminal 71b that is connected to the fixed contact ACC (ACC contact position). Therefore, the detection unit 50 is in the standby state in which the detection operation is possible (step S102: kick detection mode). Therefore, in this case, the user M who has started up the engine 40 by using the mobile device 200 from outside the vehicle 12 can open the door (the sliding door 20 in this embodiment) using the detection unit 50.

On other hand, in a case where the motive power source such as the engine 40 of the vehicle 12 is started up by the operation of the power mode changeover switch 44, that is, by the operation in the vehicle room 22, the electric power +B is applied to the detection terminal 71b that is connected to the ACC contact position. Therefore, under a circumstance where operation of opening or closing the sliding door 20 is not performed, for example, when the vehicle 12 is traveling, the detection unit 50 can be placed in a non-operation state (step S103: kick detection prohibition mode).

In this case, the detection unit 50 includes the ultrasonic sensor 76 disposed under the door of the vehicle 12 (under the front door 16 in this embodiment), and configured to detect the presence of the foot (left foot F or right foot) of the user M. The detection unit 50 continues an operation of detecting the presence of the foot (left foot F or right foot) of the user M after the engine 40 of the vehicle 12 is started up by using the mobile device 200 from outside the vehicle 12 and before the door (sliding door 20 or front door 16) is opened. If the presence of the foot (left foot F or right foot) of the user M is detected, the detection unit 50 puts the sliding door 20 into an opened state through the sliding door driving ECU 36 (door driving unit).

Thus, in a state that the engine 40 of the vehicle 12 is started up by using the mobile device 200 from outside the vehicle 12, the detection unit 50 detects the presence of the foot (left foot F or right foot) of the user M. Therefore, even when the engine 40 of the vehicle 12 is started up by using the mobile device 200 from a location remote from the vehicle 12, the sliding door 20 can be opened by using the detection unit 50.

That is to say, under a circumstance that the engine 40 of the vehicle 12 is in operation, if it is presumed that the user M does not exist in the vehicle 12 (that is, the engine 40 is in operation but the ACC signal Sacc has 0 [V], not the voltage +B, i.e., the engine 40 is operated by using the mobile device 200 from outside the vehicle), the operation of detecting the presence of the foot (left foot F or right foot) of the user M is performed. Therefore, when the user M having started up the engine 40 of the vehicle 12 by the mobile device 200 from outside the vehicle 12 wants to open the sliding door 20 of the vehicle 12, the user M can open the sliding door 20 (put the door into the opened state) by moving his/her foot (left foot F or right foot) under the detection unit 50 so that the presence of the foot is detected.

Note that when the detection unit 50 has detected the presence of the foot (left foot F or right foot) of the user M (step S1) and the sliding door 20 is put into the opened state (step S6), before starting to put the sliding door 20 into the opened state, the sliding door driving ECU 36 (door driving unit) performs authentication communication between the authentication ECU 24 and the mobile device 200 (step S5), and if the authentication communication is successfully completed, the sliding door 20 is put into the opened state.

Thus, even when the detection unit 50 is retrofitted as a retrofit option, the security is maintained because the existing sliding door driving ECU 36 (door driving unit) can put the sliding door 20 into the opened state under the authentication communication achieved by cooperation of the mobile device 200 and the authentication ECU 24.

Modifications

Figure 9:
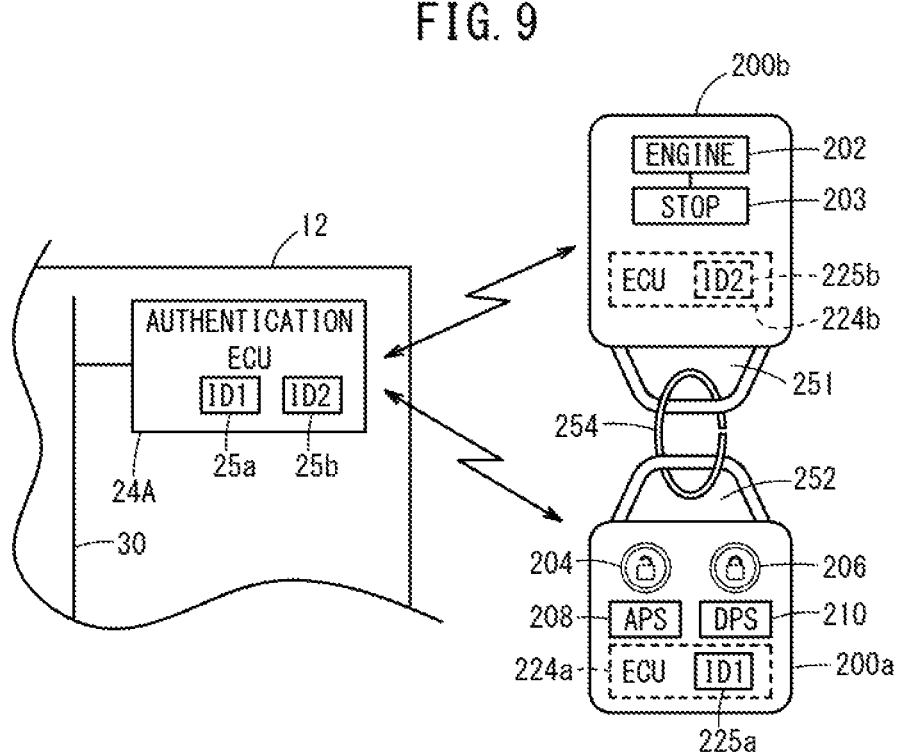
FIG. 9 is an explanatory view of a mobile device according to a modification.

In the above embodiment, the mobile device 200 is formed by integrating a mobile device serving as a remote control engine starter and a mobile device for a smart entry system; however, the mobile device is not limited to this example, and the above mobile devices may be formed separately as illustrated in FIG. 9. In FIG. 9, components corresponding to the components illustrated in FIG. 1 are denoted by the same reference signs, and the detailed description of such components is omitted.

That is to say, a first mobile device 200a configured to transmit the request signal for locking or unlocking the door of the vehicle 12 from outside the vehicle 12, and a second mobile device 200b configured to transmit the request signal for starting up the engine 40 of the vehicle 12 to thereby place the engine 40 in an operation state are separately provided.

A storage device 225a of a mobile device ECU 224a of the first mobile device 200a stores a first ID1. A storage device 225b of a mobile device ECU 224b of the second mobile device 200b stores a second ID2 that is different from the first ID1. The storage devices 25a and 25b of an authentication ECU 24A of the vehicle 12 store the first ID1 and the second ID2, respectively.

The first mobile device 200a and the second mobile device 200b respectively have openings 252 and 251 each defined by a handle and a main body. By connecting these openings 252, 251 with a ring 254, for example, the user M carries the first mobile device 200a and the second mobile device 200b together.

The detection unit 50 is provided on the vehicle 12 and contactlessly detects the presence of the foot (left foot F or right foot) of the user M located near the door of the vehicle 12 (the front door 16 or the sliding door 20), and if the presence of the user's foot is detected, the detection unit 50 opens the door (the front door 16 or the sliding door 20) automatically. If the engine 40 of the vehicle 12 is driven by using the mobile devices 200a, 200b from outside the vehicle 12 (step S101: 0 [V]), an operation of detecting the presence of the user M is continued (step S102), and if the engine 40 of the vehicle 12 is driven by the user M performing a switching operation of the power mode changeover switch 44 inside the vehicle 12, that is, in the vehicle room 22 (step S101: +B [V]), the operation of detecting the presence of the user M is stopped (prohibited) (step S103).

Thus, since the operation of detecting the presence of the user M is continued if the engine 40 is driven from outside the vehicle 12, by performing a motion (movement) to be detected by the detection unit 50, it is possible to put the door of the vehicle 12 (the front door 16 or sliding door 20) into the opened state automatically.

Furthermore, the detection unit 50 includes the detection terminal 71b that is connected to the ACC terminal 143 of the power mode changeover switch 44, and the detection unit 50 determines whether to continue or stop the detection operation of detecting the presence of the user by the detection unit 50 on the basis of the electric power (+B or 0 [V]) supplied from the vehicle 12 to the detection terminal 71b through the ACC terminal 143.

In this case, when the engine 40 is started up from outside the vehicle 12, the electric power +B is not applied to the detection terminal 71b that is connected to the ACC terminal 143 (i.e., 0 [V]). Thus, the detection unit 50 continues the detection operation. Therefore, in this case, the user M who has started the engine 40 by the mobile device 200 from outside the vehicle 12 can open the sliding door 20 using the detection unit 50.

On the other hand, if the engine 40 of the vehicle 12 is started up by the operation of the power mode changeover switch 44 by the user M, the electric power +B is applied to the detection terminal 71b that is connected to the ACC terminal 143. In this case, operation of the detection unit 50 can be stopped under a circumstance that opening/closing operation of the sliding door 20 is not performed, for example, when the vehicle 12 is traveling.

The present invention is also applicable to a case in which a vehicle travels on the right side of the road.

The present invention is not limited to the above embodiment, and various configurations can be employed on the basis of the description of the present specification.

What is claimed is:

1. A vehicle door opening/closing device comprising:
a mobile device configured to transmit a request signal for locking or unlocking a door of a vehicle from outside the vehicle, and transmit a request signal for starting up a motive power source of the vehicle to thereby place the motive power source in an operation state from outside the vehicle;
a detection unit provided on the vehicle and configured to contactlessly detect a presence of a user located near the door;
an authentication unit provided on the vehicle and configured to perform authentication communication with the mobile device;
a door driving unit provided on the vehicle and configured to put the door into an opened state when the door is in a locked state and the presence of the user is detected by the detection unit; and a power mode changeover switch provided on the vehicle and configured to, under authentication communication between the mobile device brought into the vehicle and the authentication unit, be switched among an OFF contact position, an ACCESSORY contact position, an ON contact position, and a START contact position, wherein at the OFF contact position, supply of an electric power from an energy storage unit mounted in the vehicle to the vehicle is interrupted; at the ACCESSORY contact position, the electric power is supplied to an in-vehicle electric component; at the ON contact position, the electric power is supplied to the in-vehicle electric component, and the motive power source is kept in the operation state, while connection to the ACCESSORY contact position is established except when the motive power source is started up; and at the START contact position, the motive power source is started up, wherein:

when the motive power source is started up by using the mobile device from outside the vehicle, the power mode changeover switch is switched from the OFF contact position to the START contact position while avoiding the ACCESSORY contact position and the ON contact position, and the power mode changeover switch is maintained at the START contact position even after the motive power source is placed in the operation state; and the detection unit includes a detection terminal that is connected to the ACCESSORY contact position of the power mode changeover switch, and when the electric power is not supplied from the energy storage unit to the detection terminal, the detection unit places itself in a state in which a detection operation is possible, and when the electric power is supplied, the detection unit places itself in a detection operation prohibition state.

2. The vehicle door opening/closing device according to claim 1, wherein:

the detection unit includes an ultrasonic sensor located under the door of the vehicle and configured to detect a presence of a foot of the user; and after the motive power source of the vehicle is started up by using the mobile device from outside the vehicle and before the door is opened, the detection unit continues an operation of detecting the presence of the foot of the user, and if the presence of the foot of the user is detected, the detection unit puts the door into the opened state through the door driving unit.

3. The vehicle door opening/closing device according to claim 2, wherein when the detection unit has detected the presence of the foot of the user and the door is put into the opened state, before starting to put the door into the opened state, the door driving unit performs authentication communication between the authentication unit and the mobile device, and if the authentication communication is successfully completed, the door is put into the opened state.

4. The vehicle door opening/closing device according to claim 1, wherein the mobile device configured to transmit the request signal for locking or unlocking the door of the vehicle from outside the vehicle, and transmit the request signal for starting up the motive power source of the vehicle to thereby place the motive power source in the operation state is made up of two separate mobile devices including a first mobile device configured to transmit the request signal for locking or unlocking the door of the vehicle from outside the vehicle, and a second mobile device configured to transmit the request signal for starting up the motive power source of the vehicle to thereby place the motive power source in the operation state.

* * * * *